US012381050B2

(12) United States Patent
Chang et al.

(10) Patent No.: US 12,381,050 B2
(45) Date of Patent: Aug. 5, 2025

(54) SWITCH UNIT AND SWITCHING DEVICE

(71) Applicants: Huawei Digital Power Technologies Co., Ltd., Shenzhen (CN); Shanghai Liangxin Electrical Co., Ltd., Shanghai (CN)

(72) Inventors: Yang Chang, Shanghai (CN); Jian Shi, Shanghai (CN); Zuoyong Gong, Shanghai (CN); Yunfei Lian, Shanghai (CN)

(73) Assignees: Huawei Digital Power Technologies Co., Ltd., Shenzhen (CN); Shanghai Liangxin Electrical Co., Ltd., Shanghai (CN)

( * ) Notice: Subject to any disclaimer, the term of this patent is extended or adjusted under 35 U.S.C. 154(b) by 170 days.

(21) Appl. No.: 18/192,513

(22) Filed: Mar. 29, 2023

(65) Prior Publication Data

US 2023/0238200 A1 Jul. 27, 2023

Related U.S. Application Data

(63) Continuation of application No. PCT/CN2021/117192, filed on Sep. 8, 2021.

(30) Foreign Application Priority Data

Sep. 30, 2020 (CN) ......................... 202011070205.9

(51) Int. Cl.
*H01H 33/18* (2006.01)
*H01H 33/53* (2006.01)

(52) U.S. Cl.
CPC .......... *H01H 33/182* (2013.01); *H01H 33/53* (2013.01)

(58) Field of Classification Search
CPC .... H01H 33/182; H01H 33/185; H01H 33/53; H01H 33/62; H01H 1/365; H01H 1/5805; H01H 1/58; H01H 9/342; H01H 19/08; H01H 19/64; H01H 2001/5811; H01H 2001/5816; H01H 15/005; H01H 23/006
USPC ................ 218/23, 16, 19, 26, 30, 48, 65, 67
See application file for complete search history.

(56) References Cited

U.S. PATENT DOCUMENTS

| | | | | |
|---|---|---|---|---|
| 6,605,787 B1 * | 8/2003 | Chu | ....................... | H01H 19/56 200/275 |
| 7,442,887 B2 * | 10/2008 | Graham | ................. | H01H 19/08 200/336 |
| 8,658,923 B2 * | 2/2014 | Weber | .................. | H01H 1/2041 200/11 TC |

(Continued)

FOREIGN PATENT DOCUMENTS

| | | |
|---|---|---|
| CN | 101047074 A | 10/2007 |
| CN | 105122409 A | 12/2015 |

(Continued)

*Primary Examiner* — William A Bolton
(74) *Attorney, Agent, or Firm* — Leydig, Voit & Mayer, Ltd.

(57) ABSTRACT

Embodiments of the present application relate to the field of electrical switching technologies, and provide a switch unit and a switching device. The switch unit includes at least one stationary contact assembly. Each stationary contact assembly includes a first stationary contact, a second stationary contact, and a first pin connected to the first stationary contact. The first pin is welded to a circuit board. This can reduce a quantity of contact connections, simplify a connection manner, and improve safety during use.

16 Claims, 11 Drawing Sheets

(56) References Cited

U.S. PATENT DOCUMENTS

| | | | | |
|---|---|---|---|---|
| 9,299,509 | B2 * | 3/2016 | Coquil | H01H 1/2041 |
| 9,412,528 | B2 * | 8/2016 | Wu | H01H 9/02 |
| 9,437,376 | B2 * | 9/2016 | Mattlar | H01H 9/362 |
| 9,472,362 | B2 * | 10/2016 | Uitto | H01H 33/08 |
| 2014/0097155 | A1 | 4/2014 | Uitto et al. | |
| 2016/0104591 | A1 | 4/2016 | Anglade et al. | |
| 2019/0326083 | A1 * | 10/2019 | Strand | H01H 33/14 |
| 2020/0051763 | A1 * | 2/2020 | Hoogvliet | H01H 19/04 |

FOREIGN PATENT DOCUMENTS

| | | | |
|---|---|---|---|
| CN | 208014602 | U | 10/2018 |
| CN | 110853964 | A | 2/2020 |
| CN | 211294934 | U | 8/2020 |
| CN | 112133577 | A | 12/2020 |
| CN | 213242289 | U | 5/2021 |
| CN | 214226799 | U | 9/2021 |
| EP | 3104386 | B1 | 10/2018 |
| EP | 3836177 | A1 | 6/2021 |

* cited by examiner

SWITCH UNIT AND SWITCHING DEVICE

CROSS-REFERENCE TO RELATED APPLICATIONS

This application is a continuation of International Application No. PCT/CN2021/117192, filed on Sep. 8, 2021, which claims priority to Chinese Patent Application No. 202011070205.9, filed on Sep. 30, 2020. The disclosures of the aforementioned applications are hereby incorporated by reference in their entireties.

TECHNICAL FIELD

The present application relates to the field of electrical switching technologies, and in particular, to a switch unit and a switching device.

BACKGROUND

With emergence of electric power, switching devices play an important role in many production processes and technical devices. A switching device performs two functions in a power system: 1. a control function: putting some power devices or lines into operation or stopping them from operating according to an operating requirement of the power system; 2. a protection function: when a power device or line fails, quickly removing a failed part from the power system, to ensure normal operating of a failure-free part of the power system.

In the conventional technology, a switching device is usually connected to a power system through a mechanical connection. To be specific, a wire entry/exit terminal is connected to an external wire or copper bar by using a screw. In this connection manner, due to a large quantity of contacts and impact of a space environment or the like, an installation environment is limited, and poor electrical contact is likely to occur, causing a safety accident.

SUMMARY

An objective of the present application is to provide a switch unit and a switching device, to reduce a quantity of contact connections, simplify a connection manner, and improve safety during use.

Embodiments of the present application are implemented as follows.

According to one aspect of embodiments of this application, a switch unit is provided, including at least one stationary contact assembly. Each stationary contact assembly includes a first stationary contact, a second stationary contact, and a first pin connected to the first stationary contact. The first pin is welded to a circuit board.

Optionally, the stationary contact assembly further includes a second pin connected to the second stationary contact, the first stationary contact and the first pin are integrally molded, the second stationary contact and the second pin are integrally molded, and the second pin is welded to the circuit board.

Optionally, the stationary contact assembly further includes a connector, one terminal of the connector is connected to the second stationary contact, and the other terminal is connected to the circuit board.

Optionally, a wiring terminal is disposed on the first stationary contact and/or the second stationary contact, and when the wiring terminal is used for connecting a wire, the wire extends in a preset direction.

Optionally, the switch unit further includes an auxiliary pin, one terminal of the auxiliary pin is connected to the first stationary contact or the second stationary contact, and the other terminal is welded to the circuit board.

Optionally, a first protrusion is disposed on the first stationary contact, the first protrusion is located on one side of the first stationary contact and faces a side on which an electric arc is produced, a second protrusion is disposed on the second stationary contact, and the second protrusion is located on one side of the second stationary contact and faces a side on which an electric arc is produced.

Optionally, the switch unit further includes a housing, the first pin includes a first bending portion connected to the first stationary contact and a first extending portion connected to the first bending portion, the first extending portion and the first stationary contact are located on different planes, the first pin is away from an arc discharge opening of the housing, the second pin includes a second bending portion connected to the second stationary contact and a second extending portion connected to the second bending portion, the second extending portion and the second stationary contact are located on different planes, and the second pin is away from the arc discharge opening.

Optionally, the switch unit further includes a housing and a permanent magnet disposed in the housing, an arc extinguishing area is formed when a movable contact is disconnected from the first stationary contact or the second stationary contact, the permanent magnet corresponds to the arc extinguishing area, and an included angle between a straight line on which a magnetic blowout force applied by the permanent magnet to an electric arc in the arc extinguishing area is located and an orthographic projection of the straight line on a motion plane of the movable contact is greater than or equal to 45 degrees and less than or equal to 135 degrees.

Optionally, a limiting portion is disposed on the housing, and is configured to limit a position of the first pin and/or the second pin.

Optionally, the limiting portion includes a limiting groove and a clamping protrusion, the limiting groove and the clamping protrusion are separately located on two sides of the housing in a stacking direction, the first pin and/or the second pin pass through the limiting groove, and when housings are stacked, a limiting groove and a clamping protrusion on adjacent housings are clamped, to limit the position of the first pin and/or the second pin; or the limiting portion is a limiting via, and the first pin and/or the second pin pass through the limiting via.

Optionally, an arc discharge opening is provided on the housing, an arcing space connected to the arc discharge opening is correspondingly provided in the housing, a boss is further disposed in the housing, and the boss is located in the arcing space, so that the arcing space forms a channel whose size gradually decreases and then increases.

Optionally, the first extending portion and the second extending portion separately extend out from sides of the housing, and the first extending portion and the second extending portion are separately located on adjacent sides of the housing or opposite sides of the housing.

According to another aspect of embodiments of this application, a switching device is provided, including the switch unit according to any one of the foregoing implementations, where switch units are stacked by using housings.

Optionally, the switching device further includes an arc partition board, the arc partition board includes a plurality of isolation chambers, and the isolation chambers are in a one-to-one correspondence with first pins and/or second pins of the switch units, to block charged particles.

Optionally, the arc partition board and the housing are integrally molded, or the arc partition board and the housing are separately disposed.

Optionally, a first stationary contact and a second stationary contact are diagonally arranged in the switch unit, and stationary contact assemblies in adjacent switch units are arranged in a staggered manner.

Optionally, a baffle plate and a fastener connected to a stationary contact assembly are disposed on one side of the housing, and the fastener is located between two baffle plates of adjacent housings.

Beneficial effects of embodiments of the present application include:

In the switch unit and the switching device provided in embodiments of this application, each stationary contact assembly includes a first stationary contact, a second stationary contact, and a first pin connected to the first stationary contact. When the switching device is connected to a circuit board, the switching device may be directly connected to the circuit board through the first pin, without using a binding post, thereby reducing a quantity of accidents caused by poor electrical contact. An appropriate connection manner may be used for the second stationary contact according to an actual requirement, to adapt to a space limitation and improve flexibility of wiring. In the foregoing manner, a quantity of manual contacts in a conventional connection manner can be reduced, a quantity of contact connections can be reduced, a connection manner can be simplified, and safety during use can be improved.

BRIEF DESCRIPTION OF DRAWINGS

To describe technical solutions in embodiments of the present application more clearly, the following briefly describes accompanying drawings used for describing embodiments. It should be understood that the accompanying drawings show only some embodiments of the present application, and therefore should not be considered as a limitation on the scope. A person of ordinary skill in the art may still derive other related drawings from these accompanying drawings without creative efforts.

REFERENCE NUMERALS

Figure 1:
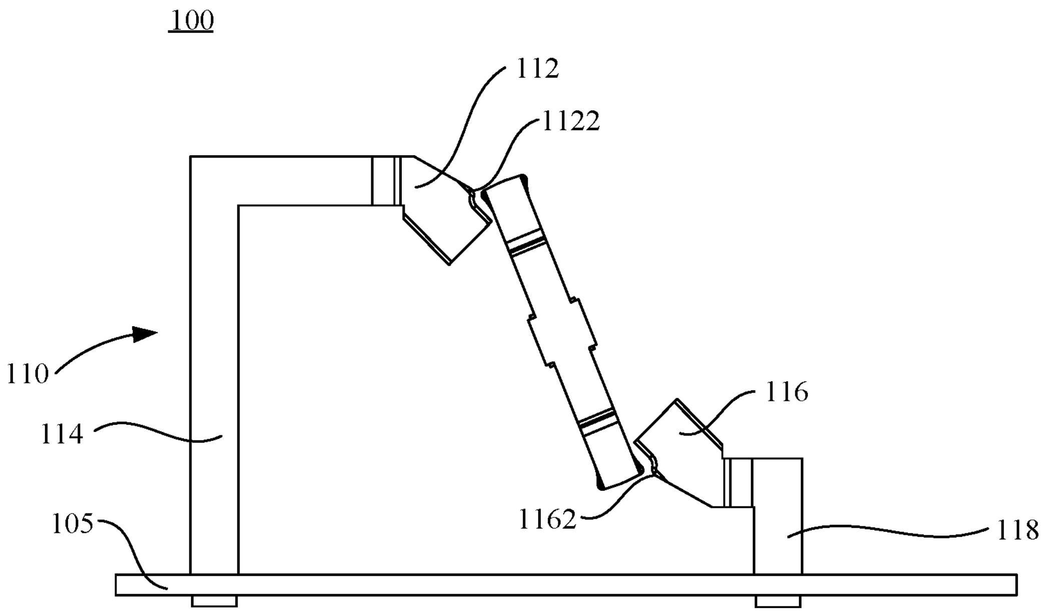
FIG. 1 is a first schematic diagram of a structure of a switch unit according to an embodiment of the present application.

100: switch unit;
105: circuit board;
107: wire;
110: stationary contact assembly;
112: first stationary contact;
1122: first protrusion;
114: first pin;
1142: first bending portion;
1144: first extending portion;
116: second stationary contact;
1262: second protrusion;
118: second pin;
1182: second bending portion;
1184: second extending portion;
130: connector;
140: wiring terminal;
150: auxiliary pin;
160: housing;
161: limiting via;
162: arc discharge opening;
163: arcing space;
164: permanent magnet;
1642: straight line on which a magnetic blowout force is located;
165: boss;
166: limiting groove;
167: baffle plate;
168: clamping protrusion;
169: fastener;
170: movable contact;
172: motion plane;
200: switching device;
210: arc partition board; and
212: isolation chamber.

DESCRIPTION OF EMBODIMENTS

To make objectives, technical solutions, and advantages of embodiments of the present application clearer, the following clearly describes technical solutions in embodiments of the present application with reference to accompanying drawings in embodiments of the present application. It is clear that described embodiments are some but not all of embodiments of the present application. Generally, components of embodiments of the present application described and shown in accompanying drawings herein may be arranged and designed in various different configurations.

Therefore, the following detailed descriptions of embodiments of the present application provided in accompanying drawings are not intended to limit the scope of the present application that claims protection, but merely to represent selected embodiments of the present application. All other embodiments obtained by a person of ordinary skill in the art based on embodiments of the present application without creative efforts shall fall within the protection scope of the present application.

It should be noted that similar reference numerals and letters represent similar items in the following accompanying drawings, and therefore if an item is defined in an accompanying drawing, the item does not need to be further defined or explained in subsequent accompanying drawings. In addition, the terms "first", "second", and the like are merely intended for differentiated description, and should not be construed as an indication or an implication of relative importance.

In descriptions of the present application, it should be further noted that, unless otherwise specified and limited, the terms "dispose" and "connect" should be understood in a broad sense. For example, a "connection" may be a fixed connection, a detachable connection, or an integrated connection; may be a mechanical connection or an electrical connection; or may be a direct connection, an indirect connection through an intermediate medium, or an internal connection between two components. A person of ordinary skills in the art may understand specific meanings of the foregoing terms in the present application according to specific circumstances.

As shown in FIG. 1, an embodiment of this application provides a switch unit 100, used in a switching device, for example, a rotary switch, an isolation switch, or a circuit breaker. The switch unit 100 includes at least one stationary contact assembly 110. Each stationary contact assembly 110 includes a first stationary contact 112, a second stationary contact 116, and a first pin 114 connected to the first stationary contact 112. The first pin 114 is welded to a circuit board 105.

Specifically, the stationary contact assembly 110 includes the first stationary contact 112 and the first pin 114 electrically connected to the first stationary contact 112, where the first stationary contact 112 is connected to a movable contact, and the first pin 114 is connected to the circuit board 105 to form a connection path. The first stationary contact 112 and the first pin 114 may be integrally molded, and a required electrical connection relationship may be formed for the second stationary contact 116 through wiring. In the foregoing manner, wiring and installation manners for transmission are changed. This helps improve stability of wiring, avoid excessive manual contacts, improve stability of a connection, and improve connection efficiency.

During fixed connection, the first pin 114 may be welded to the circuit board 105 through wave welding. In addition, during connection, a welding device may be used to perform automatic welding. This is suitable for mass production, and helps reduce labor costs and improve connection efficiency. In addition, during actual use, an electronic component inserted the circuit board 105, the switching device 200, and the circuit board 105 may form a whole. This helps reduce a quantity of contacts (that is, points for wiring) in subsequent use and simplify a connection manner.

It may be understood that the switch unit 100 has movable contacts for respectively connecting to the first stationary contact 112 and the second stationary contact 116, so that a connection path is formed when the movable contacts are respectively connected to the first stationary contact 112 and the second stationary contact 116. The movable contacts may perform a required spatial action based on a contact support, to implement a required switching-off or switching-on operation.

In the switch unit 100 provided in this embodiment of this application, each stationary contact assembly 110 includes a first stationary contact 112, a second stationary contact 116, and a first pin 114 connected to the first stationary contact 112. When the switching device is connected to the circuit board 105, the switching device may be directly connected to the circuit board 105 through the first pin 114, without using a binding post, thereby reducing a quantity of accidents caused by poor electrical contact. An appropriate connection manner may be used for the second stationary contact 116 according to an actual requirement, to adapt to a space limitation and improve flexibility of wiring. In the foregoing manner, a quantity of manual contacts in a conventional connection manner can be reduced, a quantity of contact connections can be reduced, a connection manner can be simplified, and safety during use can be improved.

As shown in FIG. 1, in an optional embodiment of this application, the stationary contact assembly 110 further includes a second pin 118 connected to the second stationary contact 116. The first stationary contact 112 and the first pin 114 are integrally molded. The second stationary contact 116 and the second pin 118 are integrally molded. The second pin 118 is welded to the circuit board 105.

Specifically, in this embodiment of this application, the first stationary contact 112 and the first pin 114 may be integrally molded, and the second stationary contact 116 and the second pin 118 are also integrally molded. In this case, the switch unit 100 is welded to the circuit board 105 through the first pin 114 and the second pin 118. This facilitates integrated disposing of a product, and helps reduce workload of a user during wiring.

Figure 2:
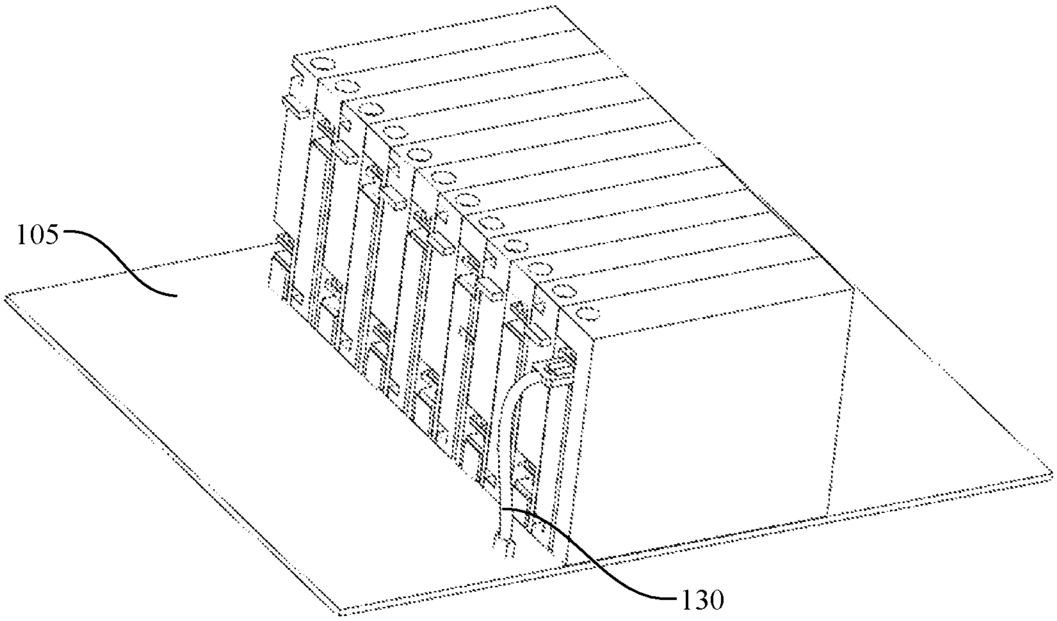
FIG. 2 is a first schematic diagram of a structure of a connection between a switch unit and a circuit board according to an embodiment of the present application.
Figure 3:
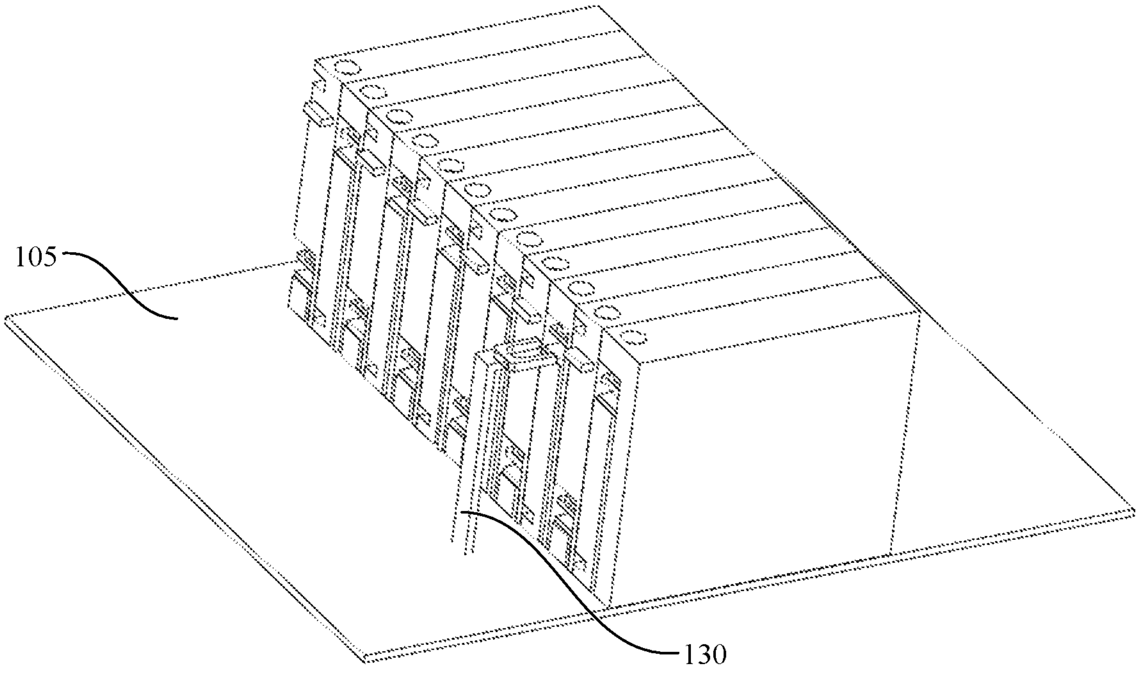
FIG. 3 is a second schematic diagram of a structure of a connection between a switch unit and a circuit board according to an embodiment of the present application.

As shown in FIG. 1 to FIG. 3, the stationary contact assembly 110 further includes a connector 130. One terminal of the connector 130 is connected to the second stationary contact 116, and the other terminal is connected to the circuit board 105.

Specifically, the connector 130 may be a flexible connector or a rigid connector. In this way, diversity of connection manners can be improved according to an actual requirement. For example, as shown in FIG. 2, when a flexible connector, for example, a copper wire, is used, and when the switch unit 100 needs to be electrically connected to a circuit board 105, the electrical connection can be better performed, avoiding difficulty in fitting due to a deviation of a hole position. This helps improve operability of an actual operation. As shown in FIG. 3, when a rigid connector, for example, a copper plate, is used, specific support may be provided during connection, preventing excessive flexibility from affecting a wiring speed. This further facilitates connection and fastening.

Figure 4:
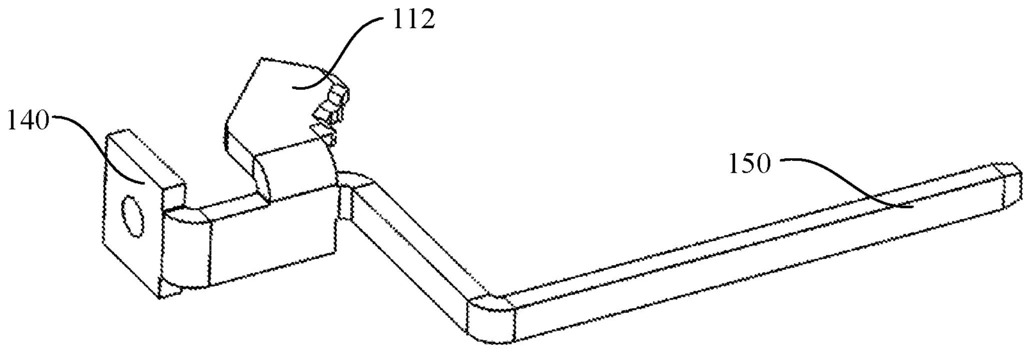
FIG. 4 is a schematic diagram of a structure of a connection between a first stationary contact and an auxiliary pin according to an embodiment of the present application.
Figure 5:
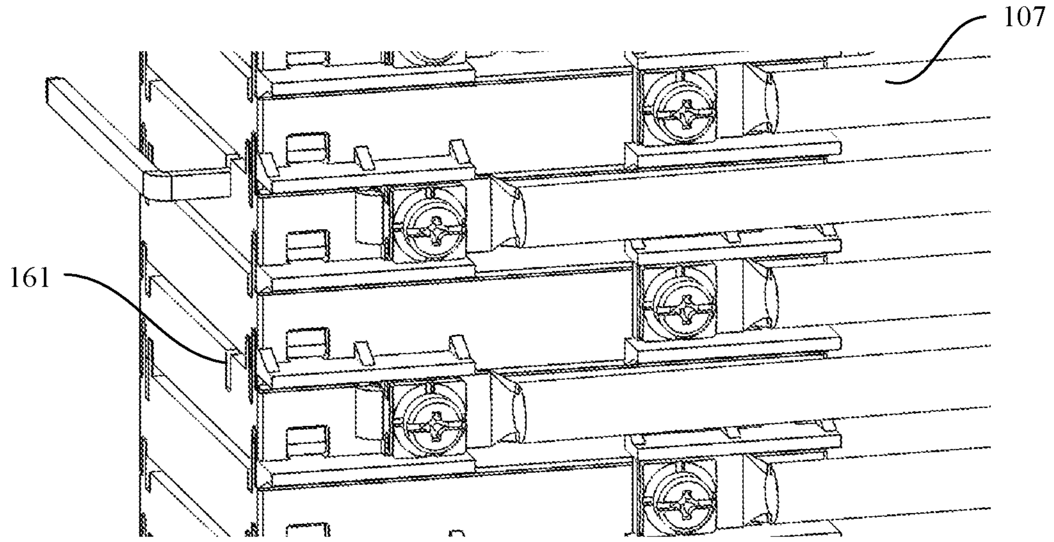
FIG. 5 is a schematic diagram of a structure of a switch unit connected to a wire according to an embodiment of the present application.

As shown in FIG. 4 and FIG. 5, a wiring terminal 140 is disposed on the first stationary contact 112 and/or the second stationary contact 116. When the wiring terminal 140 is used for connecting a wire 107, the wire 107 extends in a preset direction.

Specifically, when the switch unit 100 is connected to the circuit board 105, and when the switch unit 100 is connected to the circuit board 105 through the first wiring pin 114 or the second wiring pin 118, welding may not be suitable for wiring due to impact of an installation environment. In this case, the wire 107 may be connected to the wiring terminal 140, and the wire 107 is led to a side of the switching device on which an operation can be performed more easily. This helps improve applicability during use.

As shown in FIG. 4, the switch unit 100 further includes an auxiliary pin 150. One terminal of the auxiliary pin 150 is connected to the first stationary contact 112 or the second stationary contact 116, and the other terminal is welded to the circuit board 105. Specifically, the auxiliary pin 150 is disposed on the first stationary contact 112 or the second stationary contact 116. The auxiliary pin 150 is welded to the circuit board 105, to implement grounding through the auxiliary pin 150. When a lightning strike occurs, a current is led to the ground. This can protect the switch unit 100, and helps improve stability of the product during use.

As shown in FIG. 1, a first protrusion 1122 is disposed on the first stationary contact 112, the first protrusion 1122 is located on one side of the first stationary contact 112 and faces a side on which an electric arc is produced, a second protrusion 1262 is disposed on the second stationary contact 116, and the second protrusion 1262 is located on one side of the second stationary contact 116 and faces a side on which an electric arc is produced.

Specifically, the first protrusion 1122 and the second protrusion 1262 mainly use a characteristic of arcing at a conductor tip. When the movable contact 170 is disconnected from the first stationary contact 112 or the second stationary contact 116, a produced electric arc runs on the first stationary contact 112 or the second stationary contact 116, thereby preventing the electric arc from splashing and affecting normal and stable use of the switching device 200.

Figure 6:
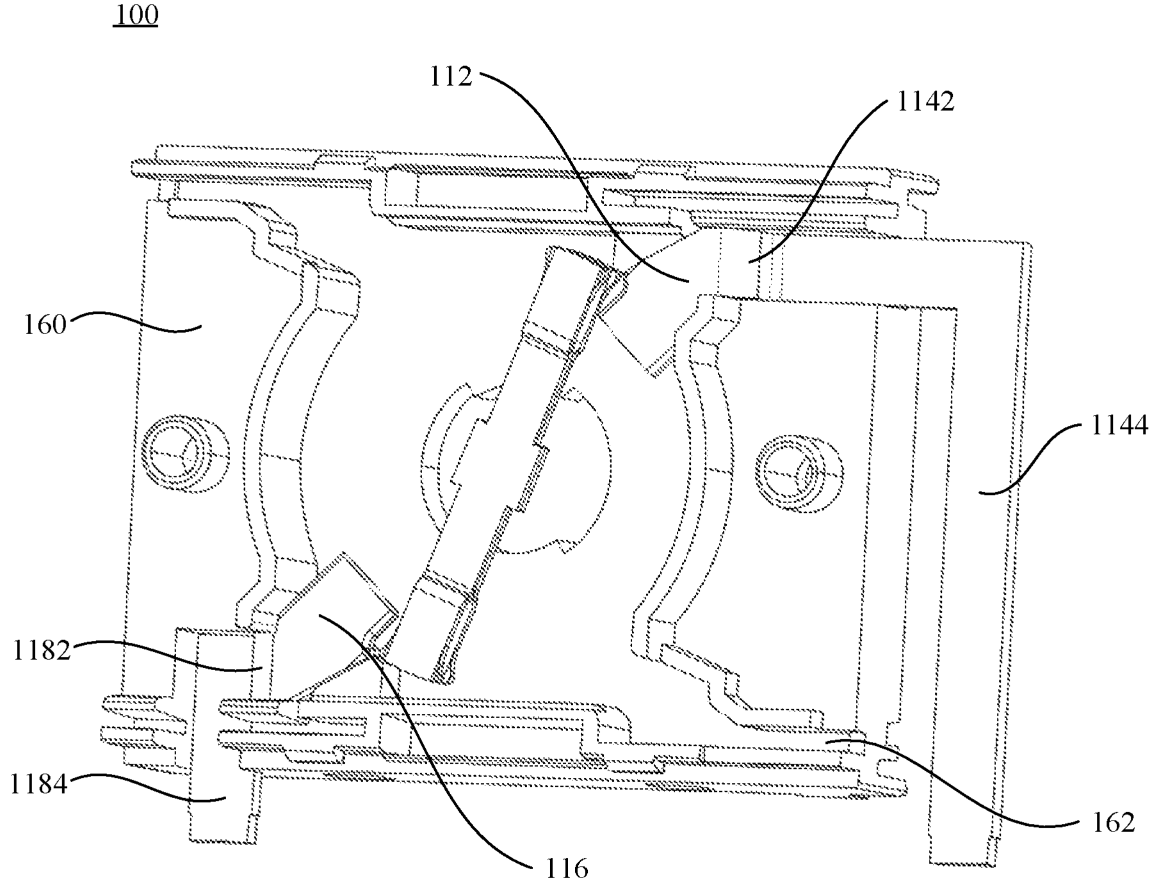
FIG. 6 is a second schematic diagram of a structure of a switch unit according to an embodiment of the present application.

As shown in FIG. 6, the switch unit 100 further includes a housing 160. The first pin 114 includes a first bending portion 1142 connected to the first stationary contact 112 and a first extending portion 1144 connected to the first bending portion 1142. The first extending portion 1144 and the first stationary contact 112 are located on different planes, and the first pin 114 is away from an arc discharge opening 162 of the housing 160. The second pin 118 includes a second bending portion 1182 connected to the second stationary contact 116 and a second extending portion 1184 connected to the second bending portion 1182. The second extending portion 1184 and the second stationary contact 116 are located on different planes, and the second pin 118 is away from the arc discharge opening 162.

Specifically, by using the first pin 114 and the first bending portion 1142 is disposed, so that the first pin 114 can be better attached to the housing 160, and stability of the connection is improved. In addition, the first pin 114 may avoid the arc discharge opening 162. The first pin 114 is disposed away from the arc discharge opening 162, so that when charged particles are produced between the movable contact 170 and the stationary contact, the charged particles are prevented from splashing onto the first pin 114 through the arc discharge opening 162 and causing a short circuit of the stationary contact assembly 110. This helps improve stability of an electrical connection.

Similarly, the second pin 118 includes the second bending portion 1182, so that the second pin 118 is better attached to the housing 160, and stability of the connection is improved. In addition, the second pin 118 may avoid the arc discharge opening 162. The second pin 118 is disposed away from the arc discharge opening 162, so that when charged particles are produced between the movable contact 170 and the stationary contact, the charged particles are prevented from splashing onto the second pin 118 through the arc discharge opening 162 and causing a short circuit of the connector 130. This helps improve stability of an electrical connection. It may be understood that, when the second stationary contact 116 is connected to the circuit board 105 by using the connector 130, the connector 130 may also be disposed away from the arc discharge opening 162, to ensure stability of the connection.

Figure 7:
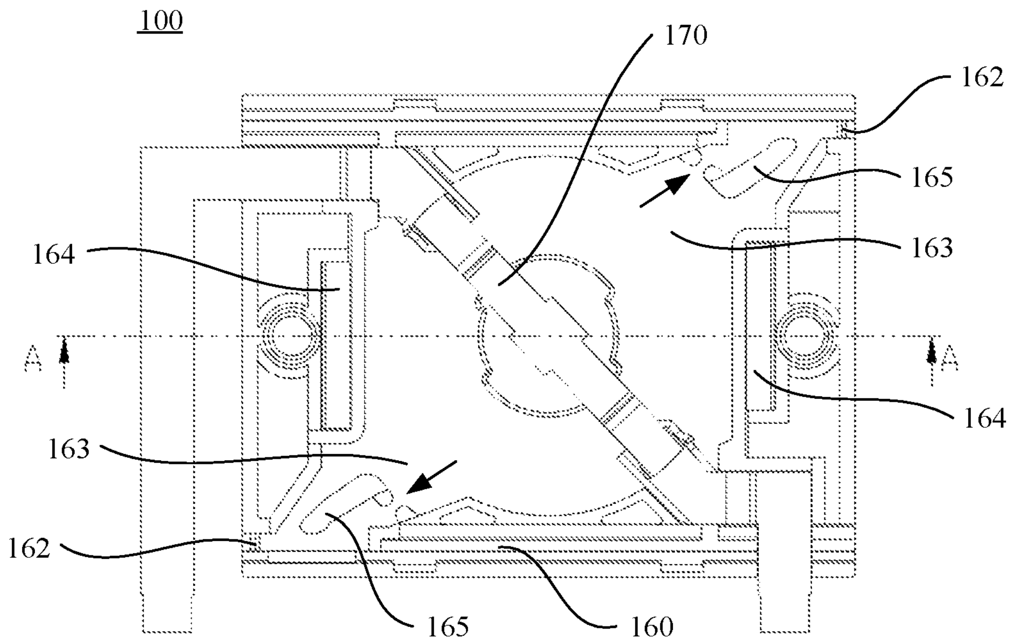
FIG. 7 is a third schematic diagram of a structure of a switch unit according to an embodiment of the present application.
Figure 8:
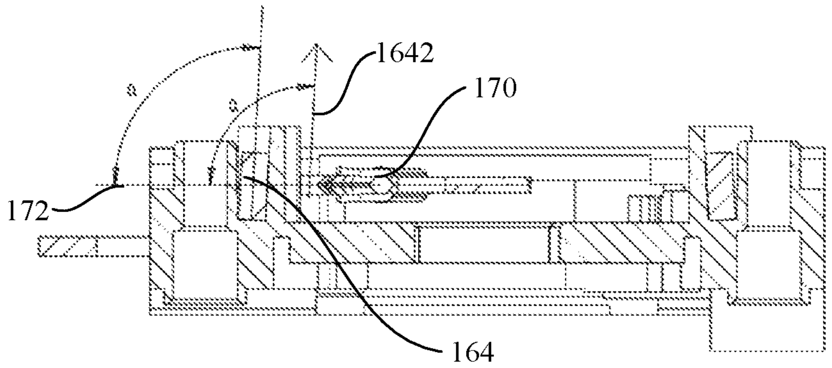
FIG. 8 is a sectional view along A-A in FIG. 7.

As shown in FIG. 7 and FIG. 8, the switch unit 100 further includes a housing 160 and a permanent magnet 164 disposed in the housing 160. An arc extinguishing area is formed when the movable contact 170 is disconnected from the first stationary contact 112 or the second stationary contact 116, and the permanent magnet 164 corresponds to the arc extinguishing area. In addition, an included angle between a straight line 1642 on which a magnetic blowout force applied by the permanent magnet 164 to an electric arc in the arc extinguishing area is located and an orthographic projection of the straight line on a motion plane 172 of the movable contact 170 is greater than or equal to 45 degrees and less than or equal to 135 degrees.

Specifically, when a position and a posture of the permanent magnet 164 change, correspondingly, the magnetic blowout force applied to the electric arc also deflects at a specific angle, and the straight line on which the magnetic blowout force is located also correspondingly deflects at the same angle. Therefore, as a deflection direction or the position of the permanent magnet 164 changes, the included angle $\alpha$ between the straight line 1642 on which the magnetic blowout force is located and the orthographic projection of the straight line on the motion plane 172 may correspondingly deflect from 45 degrees to 135 degrees. For example, the included angle may be set to 90 degrees, 60 degrees, 80 degrees, 100 degrees, or 128 degrees. When the angle is not 90 degrees, a thickness of the switch unit 100 can be further reduced. This helps improve space utilization.

In the foregoing manner, under the action of the magnetic blowout force, the electric arc extends along a direction of the magnetic blowout force. When the included angle between the straight line 1642 on which the magnetic blowout force applied to the electric arc is located and the orthographic projection of the straight line on the motion plane 172 of the movable contact 170 is greater than or equal to 45 degrees and less than or equal to 135 degrees, an arc extending space is larger. This helps increase an arc extinguishing speed. This can also avoid blocking by another component in the housing 160, thereby helping improve an arc extinguishing effect.

Still as shown in FIG. 7, an arc discharge opening 162 is provided on the housing 160, and an arcing space 163 connected to the arc discharge opening 162 is correspondingly provided in the housing 160. A boss 165 is further disposed in the housing 160, and the boss 165 is located in the arcing space 163, so that the arcing space 163 forms a channel whose size gradually decreases and then increases.

Specifically, in the foregoing manner, in an arc extinguishing process, the arcing space 163 forms a channel whose size gradually decreases and then increases. By using a Laval nozzle principle, an arc speed changes with a change of a cross section (as indicated by an arrow direction in FIG. 7). A cross section of a front part of a narrow area gradually becomes smaller, and a flow rate gradually increases. In this case, an arc flow rate exceeds a sound speed. In a rear part of the narrow area, an opening gradually becomes larger, a transonic fluid no longer conforms to a rule that a flow rate at a smaller cross section is higher and a flow rate at a larger cross section is smaller. Instead, a flow rate at a larger cross section is higher. Therefore, an overall arc flow rate increases, and an electric arc is discharged out of the arcing space 163 as soon as possible, so that the electric arc is extinguished. This helps improve stability of the switch unit 100 during use.

Figure 9:
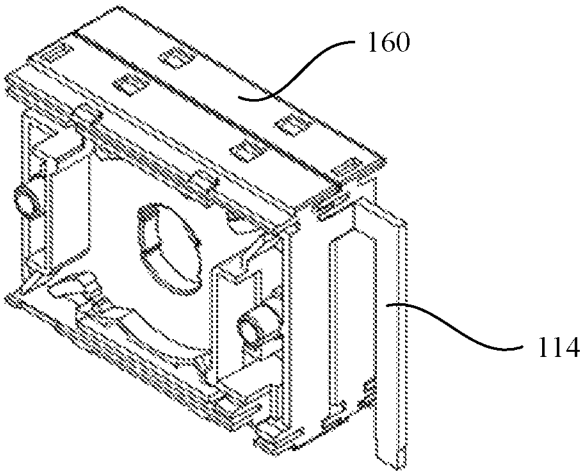
FIG. 9 is a first schematic diagram of a structure of fitting between a housing and a first pin according to an embodiment of the present application.
Figure 10:
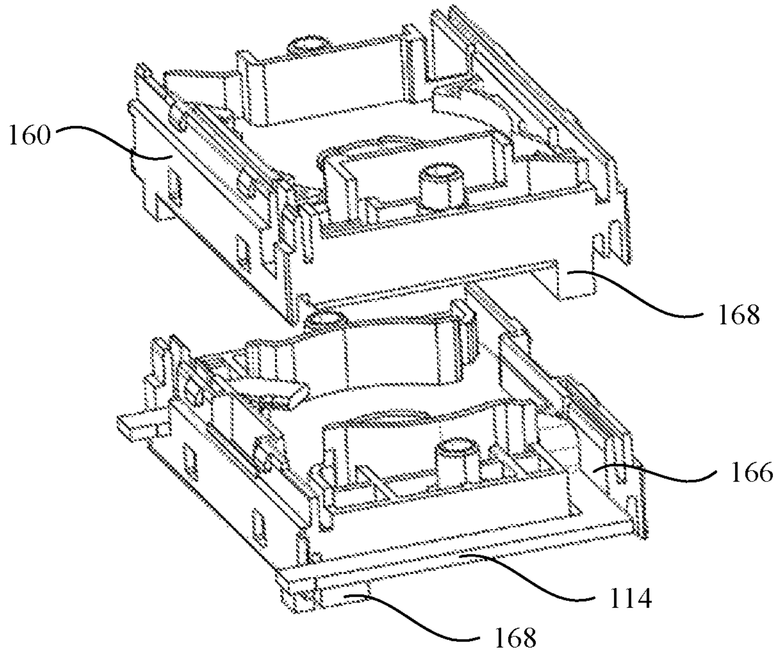
FIG. 10 is a second schematic diagram of a structure of fitting between a housing and a first pin according to an embodiment of the present application.

As shown in FIG. 9 and FIG. 10, a limiting portion is disposed on the housing 160, and is configured to limit the first pin 114 and/or the second pin 118.

Specifically, when the first stationary contact 112 is connected to the first pin 114 and the second stationary contact 116 is connected to the second pin 118, positions of the first pin 114 and the second pin 118 may be limited by using the limiting portion on the housing 160. When the second stationary contact 116 is connected in another manner, for example, the second stationary contact 116 is connected by using the connector 130, only the position of the first pin 114 may be limited. It may be understood that, alternatively, only the position of the second pin 118 may be limited based on an actual situation during actual use. It may be understood that a position of the auxiliary pin 150 may also be limited by using the limiting portion, to improve stability during connection.

Still as shown in FIG. 5, FIG. 9, and FIG. 10, the limiting portion includes a limiting groove 166 and a clamping protrusion 168. The limiting groove 166 and the clamping protrusion 168 are separately located on two sides of the housing 160 in a stacking direction. The first pin 114 and/or the second pin 118 pass through the limiting groove 166. When housings 160 are stacked, a limiting groove 166 and a clamping protrusion 168 on adjacent housings 160 are clamped, to limit the first pin 114 and/or the second pin 118. Alternatively, the limiting portion is a limiting via 161, and the first pin 114 and/or the second pin 118 pass through the limiting via.

Specifically, when the limiting portion includes the limiting groove 166 and the clamping protrusion 168, and the first pin 114 and the second pin 118 pass through the housing 160 and are connected to the circuit board 105, the first pin 114 and the second pin 118 may separately pass through the limiting groove 166, to limit the first pin 114 and the second pin 118 by using the limiting groove 166. In addition, when the adjacent housings 160 are stacked, the limiting groove 166 and the clamping protrusion 168 are clamped, to press against the first pin 114 and the second pin 118, and prevent the first pin 114 and the second pin 118 from shaking. As shown in FIG. 5, when the limiting portion is the limiting via 161, the first pin 114 and/or the second pin 118 may pass through the limiting via 161, to limit the first pin 114 and/or the second pin 118 by using the limiting via 161.

It may be understood that, depending on different connection manners during actual use, only the first pin 114 or the second pin 118 may be fastened, or all pins may be fastened in the foregoing manner. The foregoing manner is also applicable to the auxiliary pin 150.

As shown in FIG. 6, the first extending portion 1144 and the second extending portion 1184 separately extend from sides of the housing 160, and the first extending portion 1144 and the second extending portion 1184 are separately located on adjacent sides of the housing 160 or opposite sides of the housing 160.

Specifically, when a required connection relationship is formed between the switch unit 100 and the circuit board 105, the first extending portion 1144 and the second extending portion 1184 need to separately extend out from sides of the housing 160. According to an actual connection requirement, the first extending portion 1144 and the second extending portion 1184 may separately extend out from adjacent sides of the housing 160 or opposite sides of the housing 160, to ensure a required connection.

Figure 11:
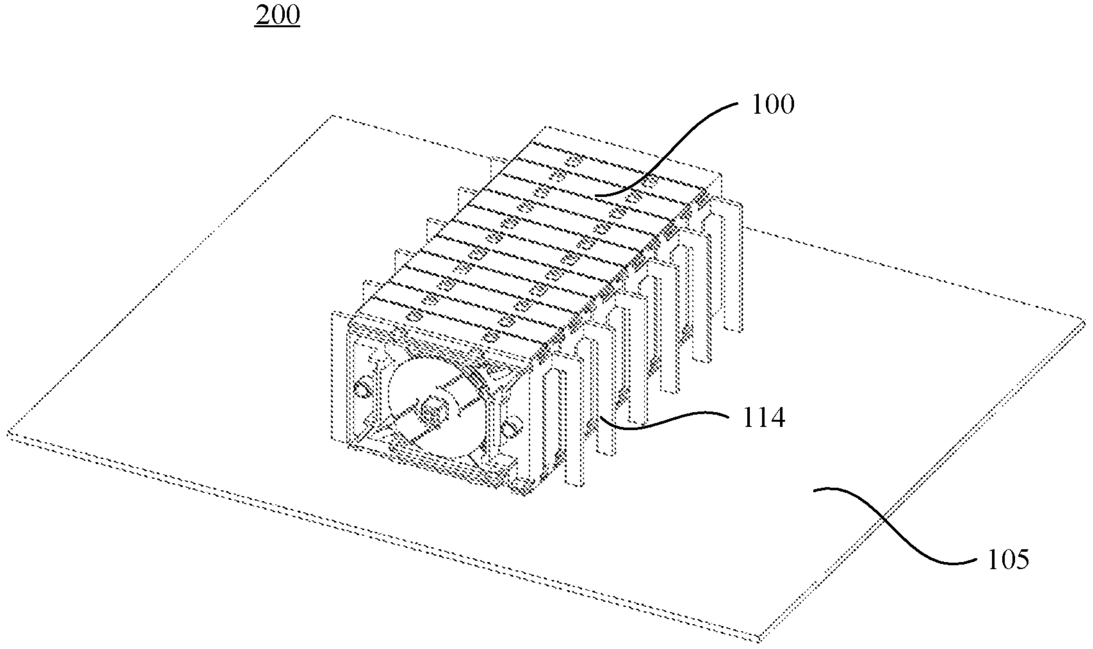
FIG. 11 is a first schematic diagram of a structure of a switching device according to an embodiment of the present application.

As shown in FIG. 11, an embodiment of this application further provides a switching device 200, including the switch unit 100 in the foregoing embodiment. Switch units 100 are stacked by using housings 160.

Figure 12:
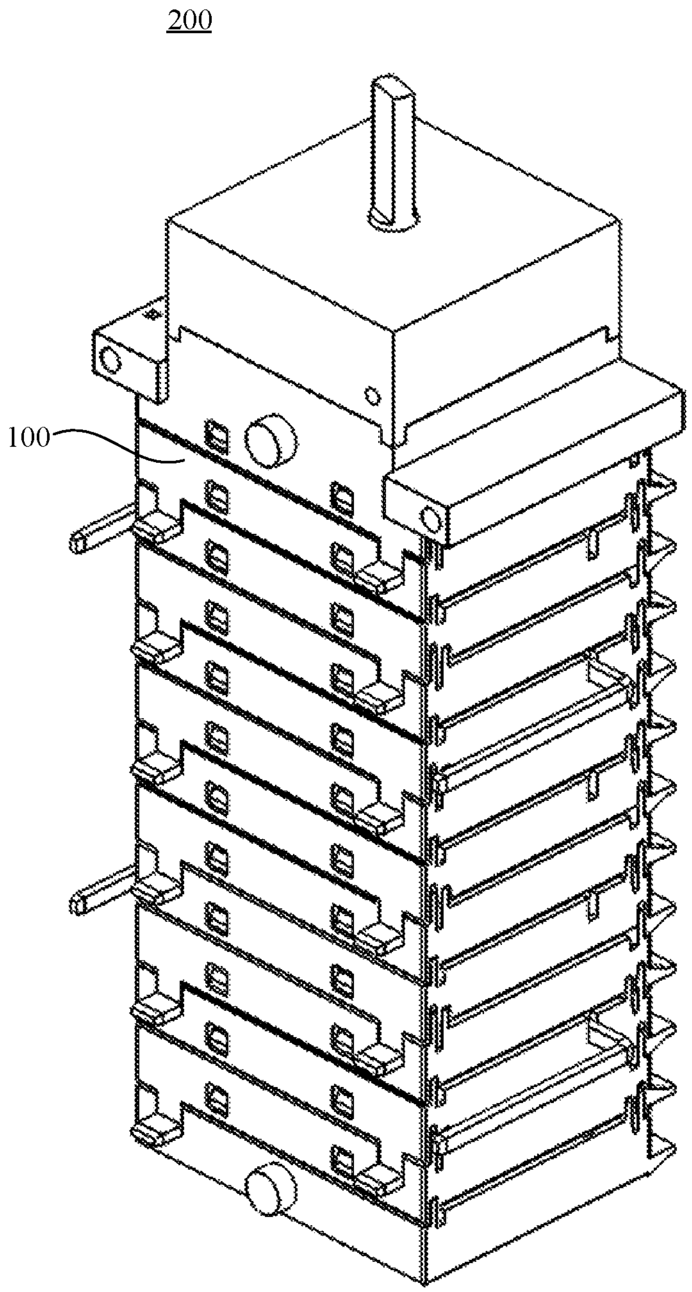
FIG. 12 is a second schematic diagram of a structure of a switching device according to an embodiment of the present application.

Specifically, in this embodiment of this application, a quantity of stacking layers of switch units 100 is not specifically limited, and switch units 100 may be flexibly disposed according to an actual requirement. For example, 8, 10, or 12 switch units 100 may be disposed. Specifically, switch units 100 may be properly disposed based on a situation of a line to which the switch units are connected. As shown in FIG. 12, when a plurality of switch units 100 are stacked, an operation shaft may be connected to a movable contact in each switch unit 100, to control a change of a spatial position of the movable contact, so as to control the switching device 200 to be switched on or switched off. In the switching device 200 provided in this embodiment of this application, a quantity of manual contacts in a conventional connection manner can be reduced, a quantity of contact connections can be reduced, a connection manner can be simplified, and safety during use can be improved.

Figure 13:
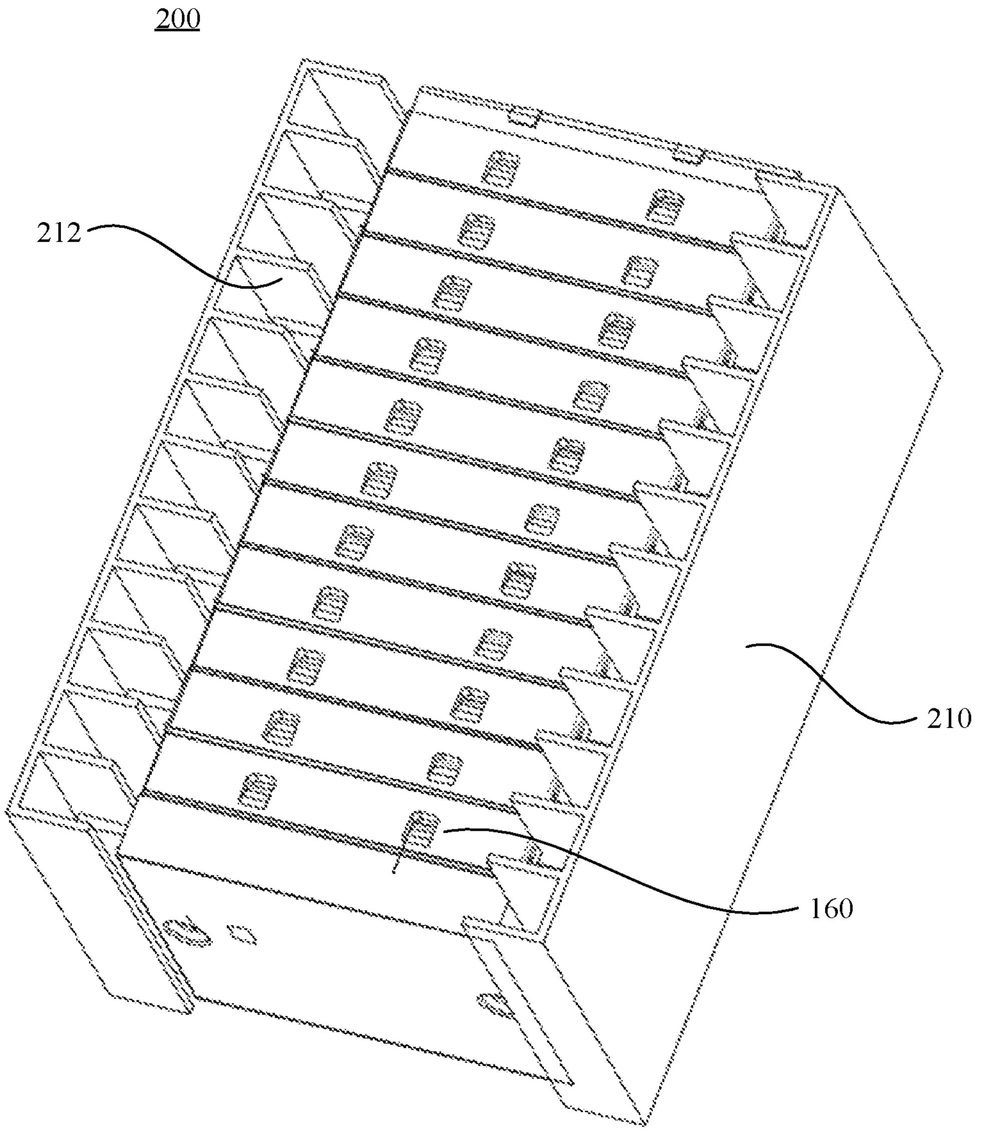
FIG. 13 is a third schematic diagram of a structure of a switching device according to an embodiment of the present application.

As shown in FIG. 13, the switching device 200 further includes an arc partition board 210. The arc partition board 210 includes a plurality of isolation chambers 212. The isolation chambers 212 are in a one-to-one correspondence with first pins 114 and/or second pins 118 of the switch units 100, to block charged particles.

Specifically, a plurality of separators spaced apart are disposed on the arc partition board 210, and an isolation chamber 212 is formed between adjacent separators. When charged particles are discharged out of an arc discharge opening 162, the charged particles are blocked by the isolation chamber 212, thereby preventing the charged particles from splashing onto the first pins 114 or the second pins 118, and avoiding a short circuit. This helps improve stability of an electrical connection. The isolation chambers 212 are in a one-to-one correspondence with the first pins 114 and/or the second pins 118, so that the stacked switch units 100 can be better protected.

In an optional embodiment of this application, the arc partition board 210 and the housing 160 are integrally molded, or the arc partition board 210 and the housing 160 are separately disposed. In this way, flexible disposing may be performed according to an actual requirement during specific use. When an operation space is small, integral molding may be performed. When an operation space is abundant, separate disposing may be performed. When the switching device 200 is connected to a circuit board 105 through the first pins 114 and the second pins 118, the isolation chambers 212 can better fit the first pins 114 or the second pins 118 when a connection position or a connection manner of the first pins 114 or the second pins 118 changes.

Figure 14:
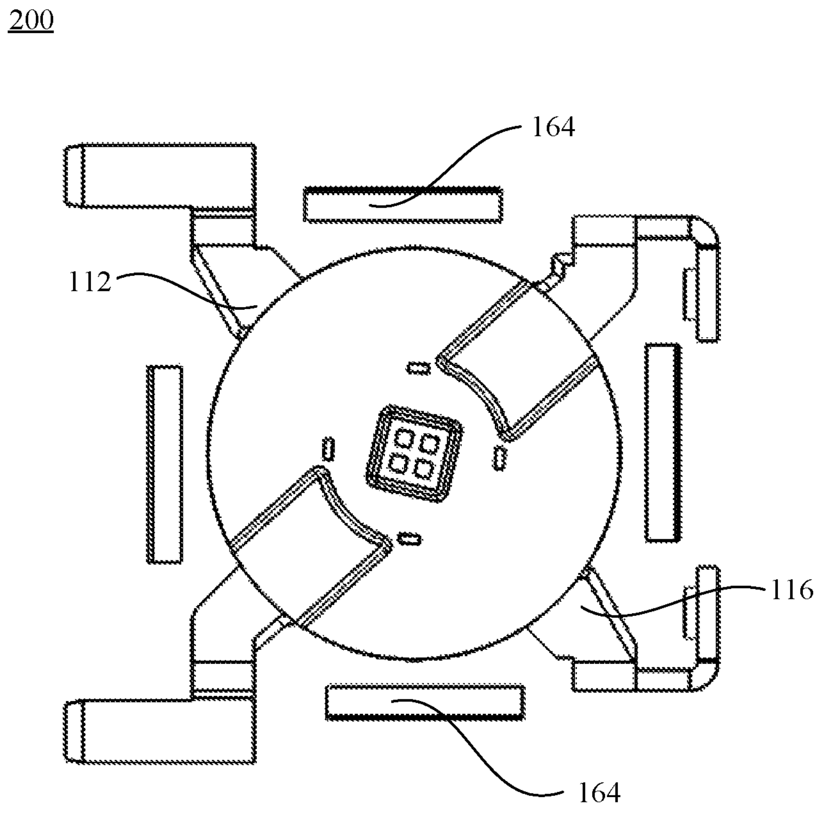
FIG. 14 is a fourth schematic diagram of a structure of a switching device according to an embodiment of the present application.

As shown in FIG. 14, a first stationary contact 112 and a second stationary contact 116 are diagonally arranged in the switch unit 100, and stationary contact assemblies 110 in adjacent switch units 100 are arranged in a staggered manner.

This can improve stability of electrical connection relationships in adjacent housings 160, and avoid mutual interference. In addition, this can also prevent a produced electric arc from splashing onto a first pin 114 or a second pin 118 disposed on an adjacent housing 160, and also helps provide more operation space, thereby reducing operation difficulty during electrical connection.

It may be understood that, when the movable contact is detached from the first stationary contact 112 or the second stationary contact 116, to ensure an arc extending space and increase an arc extinguishing speed by using a permanent magnet 164, relative positions of the permanent magnet 164, the first stationary contact 112, and the second stationary contact 116 remain unchanged. In this case, permanent magnets 164 in adjacent switch units 100 may also be arranged in a staggered manner.

Figure 15:
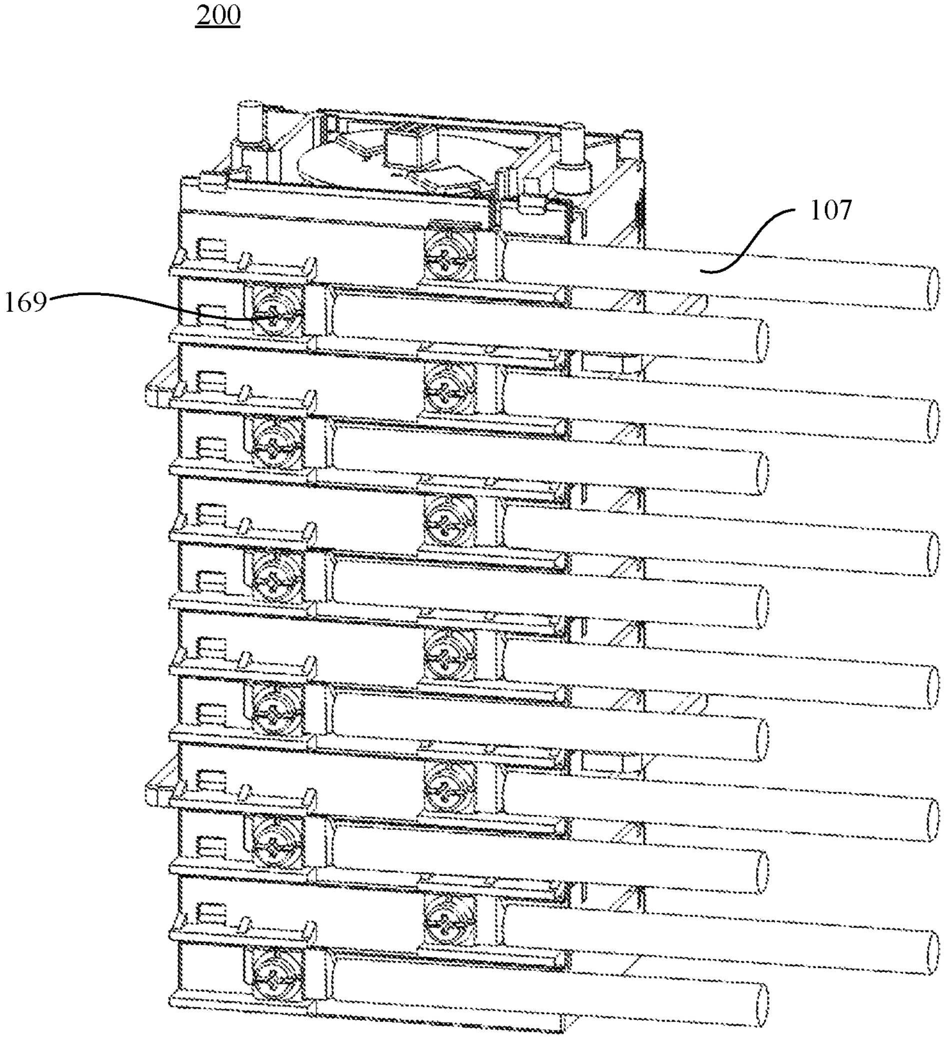
FIG. 15 is a fifth schematic diagram of a structure of a switching device according to an embodiment of the present application.
Figure 16:
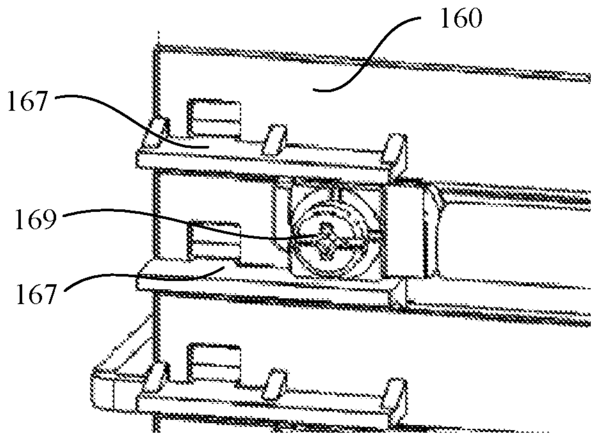
FIG. 16 is a schematic diagram of a structure of fitting between a baffle plate and a fastener according to an embodiment of the present application.

As shown in FIG. 5, FIG. 15, and FIG. 16, a baffle plate 167 and a fastener 169 connected to a stationary contact assembly 110 are disposed on one side of the housing 160, and the fastener 169 is located between two baffle plates 167 of adjacent housings 160.

Specifically, when the fastener 169 is connected to a stationary contact by using a wire 107, the wire 107 and the stationary contact assembly 110 are connected and fastened, to form an electrical connection path. The fastener 169 may be in a form of a screw in combination with a square pad. When the screw is used for fastening, the baffle plate 167 may be used for limiting on the square pad, to prevent the pad from rotating along with the screw. This helps better press against the wire 107 and improve stability of an electrical connection. In addition, in the foregoing manner, the stationary contact and the fastener 169 that are adjacent may be separated, to increase an electric clearance and a creepage distance.

It should be noted that the fastener 169 may protrude from the baffle plate 167 in a height direction, or may be located in a space enclosed by two baffle plates 167. For example, when the fastener 169 is in a form of a screw in combination with a square pad, only the square pad needs to be disposed in a space enclosed by two baffle plates 167, to prevent the square pad from rotating correspondingly when the screw rotates.

The foregoing descriptions are merely optional embodiments of the present application, but not intended to limit the present application. A person skilled in the art may make various changes and variations to the present application. Any modification, equivalent replacement, or improvement made without departing from the spirit and principle of the present application shall fall within the protection scope of the present application.

What is claimed is:

1. A switch, comprising:

at least one stationary contact assembly; and a housing comprising a baffle plate;

wherein each stationary contact assembly of the at least one stationary contact assembly comprises a first stationary contact, a second stationary contact, and a first pin connected to the first stationary contact, and wherein the first pin is welded to a circuit board; and wherein the baffle plate and a first fastener connected to the at least one stationary contact assembly are disposed on one side of the housing, and the first fastener is located between the baffle plate of the housing of the switch and a second baffle plate of a second housing of a second switch.

2. The switch according to claim 1, wherein:

the at least one stationary contact assembly further comprises a second pin connected to the second stationary contact;

the first stationary contact and the first pin are integrally molded;

the second stationary contact and the second pin are integrally molded; and the second pin is welded to the circuit board.

3. The switch according to claim 2, wherein a wiring terminal is disposed on the first stationary contact and/or the second stationary contact, and when the wiring terminal is used for connecting a wire, the wire extends in a preset direction.

4. The switch according to claim 2, wherein the first pin comprises a first bending portion connected to the first stationary contact and a first extending portion connected to the first bending portion, the first extending portion and the first stationary contact are located on different planes, and the first pin is away from an arc discharge opening of the housing; and wherein the second pin comprises a second bending portion connected to the second stationary contact and a second extending portion connected to the second bending portion, the second extending portion and the second stationary contact are located on different planes, and the second pin is away from the arc discharge opening.

5. The switch according to claim 4, wherein a limiting portion is disposed on the housing, and the limiting portion is configured to limit a position of the first pin and/or the second pin.

6. The switch according to claim 5, wherein:

the limiting portion comprises a limiting groove and a clamping protrusion, the limiting groove and the clamping protrusion are separately located on two sides of the housing in a stacking direction, the first pin and/or the second pin pass through the limiting groove, and when housings are stacked, a limiting groove and a clamping protrusion on adjacent housings are clamped, to limit the position of the first pin and/or the second pin; or the limiting portion is a limiting via, and the first pin and/or the second pin pass through the limiting via.

7. The switch according to claim 4, wherein the first extending portion and the second extending portion separately extend out from sides of the housing, and the first extending portion and the second extending portion are separately located on adjacent sides of the housing or opposite sides of the housing.

8. The switch according to claim 1, wherein:

the at least one stationary contact assembly further comprises a connector;

one terminal of the connector is connected to the second stationary contact; and another terminal of the connector is connected to the circuit board.

9. The switch according to claim 1, further comprising:

an auxiliary pin, wherein one terminal of the auxiliary pin is connected to the first stationary contact or the second stationary contact, and another terminal of the auxiliary pin is welded to the circuit board.

10. The switch according to claim 1, wherein:

a first protrusion is disposed on the first stationary contact, and the first protrusion is located on one side of the first stationary contact and faces a side on which an electric arc is produced; and a second protrusion is disposed on the second stationary contact, and the second protrusion is located on one side of the second stationary contact and faces a side on which an electric arc is produced.

11. The switch according to claim 1, further comprising:

a permanent magnet disposed in the housing;

wherein an arc extinguishing area is formed when a movable contact is disconnected from the first stationary contact or the second stationary contact, the permanent magnet corresponds to the arc extinguishing area, and an included angle between a straight line on which a magnetic blowout force applied by the permanent magnet to an electric arc in the arc extinguishing area is located and an orthographic projection of the straight line on a motion plane of the movable contact is greater than or equal to 45 degrees and less than or equal to 135 degrees.

12. The switch according to claim 11, wherein an arc discharge opening is provided on the housing, and an arcing space connected to the arc discharge opening is correspondingly provided in the housing; and wherein a boss is further disposed in the housing, and the boss is located in the arcing space, so that the arcing space forms a channel whose size gradually decreases and then increases.

13. A switching device, comprising:

a plurality of switches, wherein each switch of the plurality of switches comprises a stationary contact assembly and a housing, wherein the stationary contact assembly comprises a first stationary contact, a second stationary contact, and a first pin connected to the first stationary contact, and wherein the first pin is welded to a circuit board;

wherein the plurality of switches are stacked by using housings of the plurality of switches; and wherein, for a given switch of the plurality of switches, a baffle plate and a fastener connected to the stationary contact assembly are disposed on one side of the housing, and the fastener is located between two baffle plates of adjacent housings of adjacent switches.

14. The switching device according to claim 13, further comprising:

an arc partition board, wherein the arc partition board comprises a plurality of isolation chambers, and the isolation chambers in the plurality of isolation chambers are in a one-to-one correspondence with first pins and/or second pins of the plurality of switches, to block charged particles.

15. The switching device according to claim 14, wherein the arc partition board and the housings of the plurality of switches are integrally molded, or the arc partition board and the housings of the plurality of switches are separately disposed.

16. The switching device according to claim 13, wherein the first stationary contact and the second stationary contact are diagonally arranged in each switch of the plurality of switches, and stationary contact assemblies in adjacent switches of the plurality of switches are arranged in a staggered manner.

* * * * *